United States Patent
Wei et al.

(10) Patent No.: US 9,837,924 B1
(45) Date of Patent: Dec. 5, 2017

(54) PRECHARGE APPARATUS FOR POWER CONVERSION SYSTEM

(71) Applicant: Rockwell Automation Technologies, Inc., Mayfield Heights, OH (US)

(72) Inventors: Lixiang Wei, Mequon, WI (US); Zeljko Radomir Jankovic, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 15/171,387

(22) Filed: Jun. 2, 2016

(51) Int. Cl.
*H02M 5/44* (2006.01)
*H02M 7/04* (2006.01)
*H02M 1/12* (2006.01)
*H02M 5/458* (2006.01)

(52) U.S. Cl.
CPC ............. *H02M 7/04* (2013.01); *H02M 1/12* (2013.01); *H02M 5/44* (2013.01); *H02M 5/458* (2013.01)

(58) Field of Classification Search
CPC ............ H02M 7/02; H02M 7/04; H02M 7/12; H02M 7/145; H02M 7/217; H02M 7/155; H02M 5/4585; H02M 5/42; H02M 5/443; H02M 5/4505; H02M 5/458; H02M 5/44; H02M 1/12

See application file for complete search history.

(56) References Cited

U.S. PATENT DOCUMENTS

| | | |
|---|---|---|
| 4,937,719 A | 6/1990 | Yamada et al. |
| 5,343,381 A | 8/1994 | Bolduc et al. |
| 6,166,929 A | 12/2000 | Ma et al. |
| 6,269,010 B1 | 7/2001 | Ma et al. |
| 6,842,351 B2 | 1/2005 | Gauthier et al. |
| 6,934,167 B2 | 8/2005 | Jang et al. |
| 7,190,143 B2 | 3/2007 | Wei et al. |
| 7,274,576 B1 | 9/2007 | Zargari et al. |
| 7,502,238 B2 | 3/2009 | Wei et al. |
| 7,602,622 B2 | 10/2009 | Wei et al. |
| 7,606,052 B2 | 10/2009 | Akagi |
| 7,728,544 B2 | 6/2010 | Qian et al. |
| 7,990,097 B2 | 8/2011 | Cheng et al. |

(Continued)

FOREIGN PATENT DOCUMENTS

| | | |
|---|---|---|
| CN | 204441884 U | 7/2015 |
| DE | 2704112 A1 | 7/1978 |

(Continued)

OTHER PUBLICATIONS

Ahmed, et al., "Passive Filter Design for Three-Phase Inverter Interfacing in Distributed Generation", IEEE Xplore, downloaded on Apr. 18, 2010 at 13:45:10 UTC from IEEE Xplore, 9 pgs.

(Continued)

*Primary Examiner* — Gustavo Rosario Benitez
(74) *Attorney, Agent, or Firm* — Fay Sharpe LLP (57) ABSTRACT

Power conversion systems, methods and precharge systems are disclosed to charge a DC bus capacitor, including thyristors and reverse diodes coupled in AC circuit paths between AC input lines and a rectifier, a precharge resistor coupled in one or more of the AC circuit paths, and a controller to turn all the thyristors off to allow the DC bus capacitor to charge through the precharge resistor, and to turn all the thyristors on when the DC bus voltage reaches a non-zero threshold value.

15 Claims, 6 Drawing Sheets

(56) References Cited

U.S. PATENT DOCUMENTS

| | | | |
|---|---|---|---|
| 8,816,625 B2 | 8/2014 | Kopiness et al. | |
| 8,816,631 B2 | 8/2014 | Wei et al. | |
| 9,673,695 B1* | 6/2017 | Li | H02M 1/32 |
| 2005/0213357 A1* | 9/2005 | Paatero | H02M 5/458 |
| | | | 363/95 |
| 2008/0278109 A1 | 11/2008 | Qian et al. | |
| 2010/0078998 A1* | 4/2010 | Wei | H02M 5/458 |
| | | | 307/31 |
| 2013/0076285 A1 | 3/2013 | Choi et al. | |
| 2013/0119903 A1* | 5/2013 | Weiss | H02H 9/001 |
| | | | 318/400.3 |
| 2013/0208515 A1* | 8/2013 | Swamy | H02M 1/36 |
| | | | 363/37 |
| 2013/0241451 A1 | 9/2013 | Wei et al. | |
| 2013/0286692 A1 | 10/2013 | Patel et al. | |
| 2013/0289911 A1 | 10/2013 | Patel et al. | |
| 2014/0117910 A1* | 5/2014 | Le | G01R 31/42 |
| | | | 318/490 |
| 2014/0268953 A1 | 9/2014 | Patel et al. | |
| 2014/0268954 A1 | 9/2014 | Wei et al. | |
| 2014/0300298 A1* | 10/2014 | Liu | H02P 3/22 |
| | | | 318/380 |
| 2015/0098257 A1* | 4/2015 | Wei | H05K 7/1432 |
| | | | 363/37 |

FOREIGN PATENT DOCUMENTS

| | | |
|---|---|---|
| EP | 0975084 A2 | 1/2000 |
| EP | 2200165 A1 | 6/2010 |
| JP | H07322484 A | 12/1995 |
| WO | WO 2012/097529 A1 | 7/2012 |

OTHER PUBLICATIONS

Extended European Search Report of European Application No. 17173261.3-1809 dated Aug. 3, 2017, 8 pages.

* cited by examiner

PRECHARGE APPARATUS FOR POWER CONVERSION SYSTEM

BACKGROUND INFORMATION

The subject matter disclosed herein relates to power conversion and more specifically to power converters and precharging methods and apparatus therefor.

BRIEF DESCRIPTION

Various aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present various concepts of the disclosure in a simplified form prior to the more detailed description that is presented hereinafter. The present disclosure provides power conversion systems, methods and precharge systems to charge a DC bus capacitor, including thyristors or other semiconductor switching devices and reverse diodes coupled in AC circuit paths between AC input lines and a rectifier. A precharge resistor is coupled in one or more of the AC circuit paths. A controller turns all the thyristors off to allow the DC bus capacitor to charge through the precharge resistor, and turns all the thyristors on when the DC bus voltage reaches a non-zero threshold value.

DETAILED DESCRIPTION

In the drawings, like reference numerals refer to like elements throughout, and the various features are not necessarily drawn to scale. In the following discussion and in the claims, the terms "coupled", "couple", "couples" or variants thereof are intended to include indirect or direct electrical connection or combinations thereof. For example, if a first device couples to or is coupled with a second device, that connection may be through a direct electrical connection, or through an indirect electrical connection via one or more intervening devices and connections. Several embodiments or implementations are hereinafter described in conjunction with the drawings, wherein like reference numerals are used to refer to like elements throughout, and wherein the various features are not necessarily drawn to scale.

Figure 1:
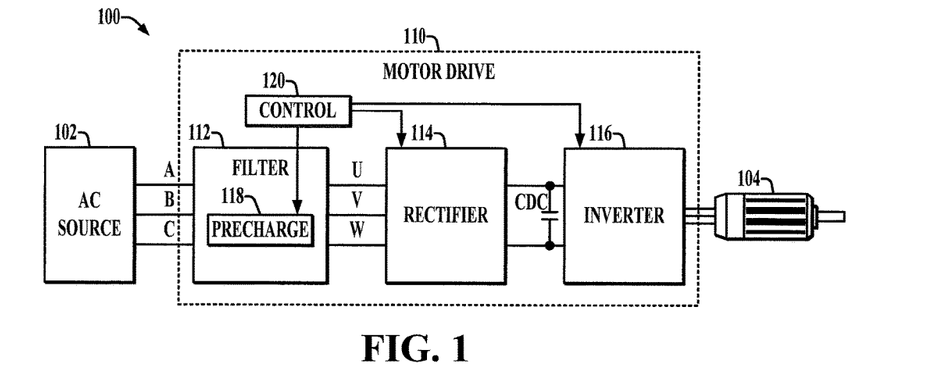
FIGS. 1-9 are schematic diagrams.
Figure 2:
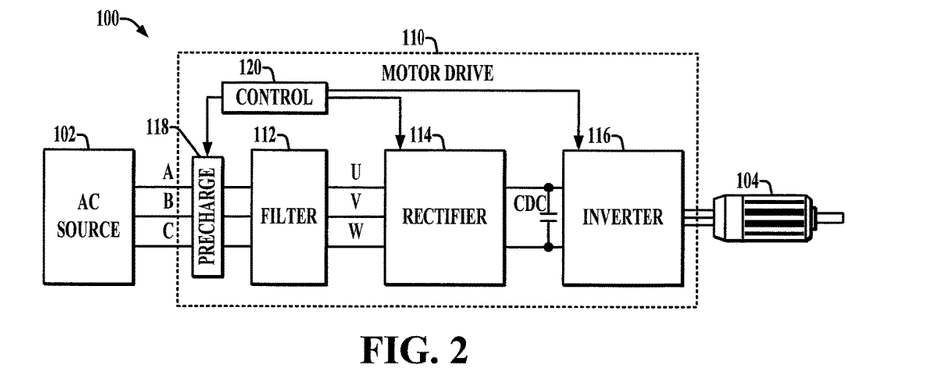
Figure 3:
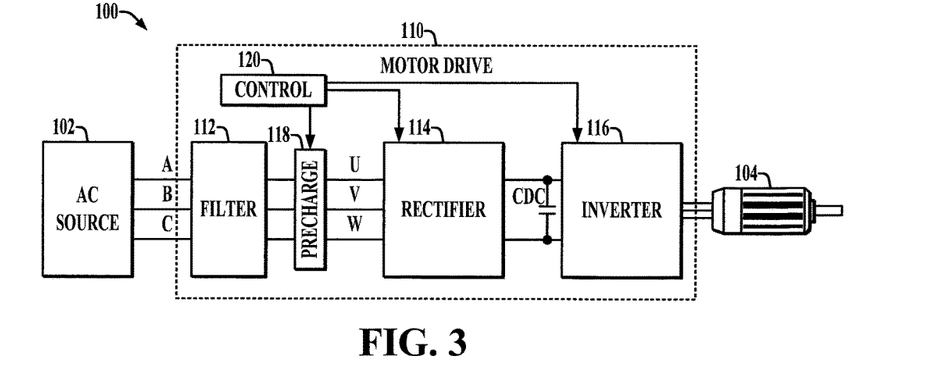

Referring initially to FIGS. 1-3, a system 100 is shown, including a three phase AC power source 102 with a grid connection and associated feeder lines that provide AC input power to AC input phase lines A, B and C of a motor drive power conversion system 110 to drive a motor load 104. Disclosed examples include power conversion systems 110, methods and precharge systems 118, 120 to charge a DC bus capacitor CDC at the output of a switching rectifier 114. The rectifier 114 includes rectifier switching devices S1-S6 individually coupled between a corresponding one of the AC input terminals U, V, W and one of the first and second DC output terminals DC+, DC−. As shown in the examples of FIGS. 3-9, the precharge circuitry includes solid state or semiconductor switching devices such as thyristors (e.g., SCRs) Qa, Qb and Qc and reverse diodes Da, Db and Dc coupled in AC circuit paths between the AC input lines A, B, C and the rectifier 114. A precharge resistor R is coupled in one or more of the AC circuit paths, and a controller 120 turns off all the thyristors Qa, Qb, Qc to allow the DC bus capacitor CDC to charge through the precharge resistor R, and turns the thyristors on when the DC bus voltage VDC reaches a non-zero threshold value TH. The use of solid state precharge switching circuitry advantageously avoids or mitigates the cost, size and weight issues associated with precharging contactors or circuit breakers, and the disclosed examples do not require complicated switching logic in order to facilitate precharging of the DC bus capacitor CDC, as well as the possibility of precharging filter capacitors Cf of the input filter circuit 112. In this regard, solid state precharge circuitry 118 can be located within the filter circuit 112 as shown in FIG. 1, upstream of (e.g., before) the input filter circuit 112 (FIG. 2) or after (e.g., downstream of) the filter circuit 112 (FIG. 3) and various embodiments. The precharging apparatus and techniques of the disclosed examples can be employed to mitigate or reduce inrush current and associated stress or degradation of the power conversion system components, and avoid undesired tripping of the converter 110.

As shown in FIGS. 1-3, the power conversion system 110 includes a three phase input filter circuit 112 that delivers AC power to the input terminals U, V and W of the three-phase active front end (AFE) rectifier 114. The drive 110 includes a feedback circuit 128, and a control circuit or controller 120. The rectifier 114 has an input to receive AC input power via the terminals U, V and W, and an output to provide a DC output signal at DC output terminals DC+ and DC−. The feedback circuit 128 in one example provides three phase input voltage values to the controller 120, and the controller 120 determines the phase angle of the input line to line voltage. An intermediate DC circuit or DC bus is connected between the DC output terminals DC+ and DC− of the rectifier 114 and the input of an inverter 116. In one example, the DC intermediate circuit includes a capacitor CDC connected between positive and negative DC bus lines DC+ and DC− as shown in FIG. 1.

The inverter 116 includes a DC input coupled to the output terminals of the rectifier 114 through the intermediate circuit, and an output coupleable to the motor load 104 to provide an AC output signal. In this example, the inverter 116 provides a three-phase output signal to drive the motor load 104. In other examples, a single-phase AC output signal can be provided by the output of the inverter 116 to drive a load 104. The AFE rectifier 114 can provide DC input power to any suitable load or loads. In the example of FIG. 1, the system 110 includes a single inverter 116 operated by an inverter controller 126 to drive a single motor load 104. In other examples, the AFE rectifier 114 and the filter circuit 112 can be used in a multi-drive configuration to provide DC input power to multiple loads, such as a plurality of inverters 116 individually driving a separate motor load 104. Such a system can be provided in a multi-bay enclosure with common DC bus connections to provide power from the rectifier 114 to a plurality of inverters 116. The power conversion system 110 can include a variety of different input filter circuit topologies or configurations. For example, an inductor-capacitor (LC) or inductor-capacitor-inductor (LCL) input filter circuit can be associated with each AC input phase A/U, B/V, C/W to control the harmonic content of a connected power grid. In other examples, the conversion system can include an AFE rectifier 114 to provide a DC output, without an included inverter or driven motor.

As further shown in FIGS. 4-7, the system 110 includes a controller 120 with one or more processors 200 and associated electronic memory 202 with program instructions to operate the rectifier 114, any included inverter 116, and to also control precharging of the DC bus capacitor CDC. The controller 120 in one example includes a rectifier control component or system 126 that provides rectifier switching control signals 125 to IGBTs or other switches S1-S6 to operate the AFE rectifier 114. The controller 120 in one example also includes or implements an inverter control component or system to provide inverter switching control signals (not shown) to operate the inverter 116. The controller 120 operates the motor drive 110 in various operational modes, and obtains measurements of various system operating parameters and signals or values 130 from the feedback system 128. The controller 120 and the components thereof may be any suitable hardware, processor-executed software, processor-executed firmware, logic, or combinations thereof that are adapted, programmed, or otherwise configured to implement the functions illustrated and described herein. The controller 120 in certain embodiments may be implemented, in whole or in part, as software components executed using one or more processing elements, such as one or more processors 200, and may be implemented as a set of sub-components or objects including computer executable instructions stored in the non-transitory computer readable electronic memory 202 for operation using computer readable data executing on one or more hardware platforms such as one or more computers including one or more processors, data stores, memory, etc.

The components of the controller 120 may be executed on the same computer processor or in distributed fashion in two or more processing components that are operatively coupled with one another to provide the functionality and operation described herein. The controller 120 in one example is configured by execution in the processor 200 of instructions in the memory 202 to implement various motor drive functions as are known, as well as resonance detection and impedance computation functionality via the component 122 provided as a component including processor-executable instructions in the memory 202 in one example. Similarly, the rectifier control functions can be implemented at least in part via processor executable instructions 124 stored in the memory 202 for execution by the processor 200. In addition, the controller 120 can include various signal conditioning circuits for receiving and converting analog signals into digital signals, and for providing suitable output signals (e.g., rectifier switching control signals 125 and inverter switching control signals 127 (FIG. 1) suitable for operating the various switching devices of the rectifier 114 and the inverter 116.

Figure 4:
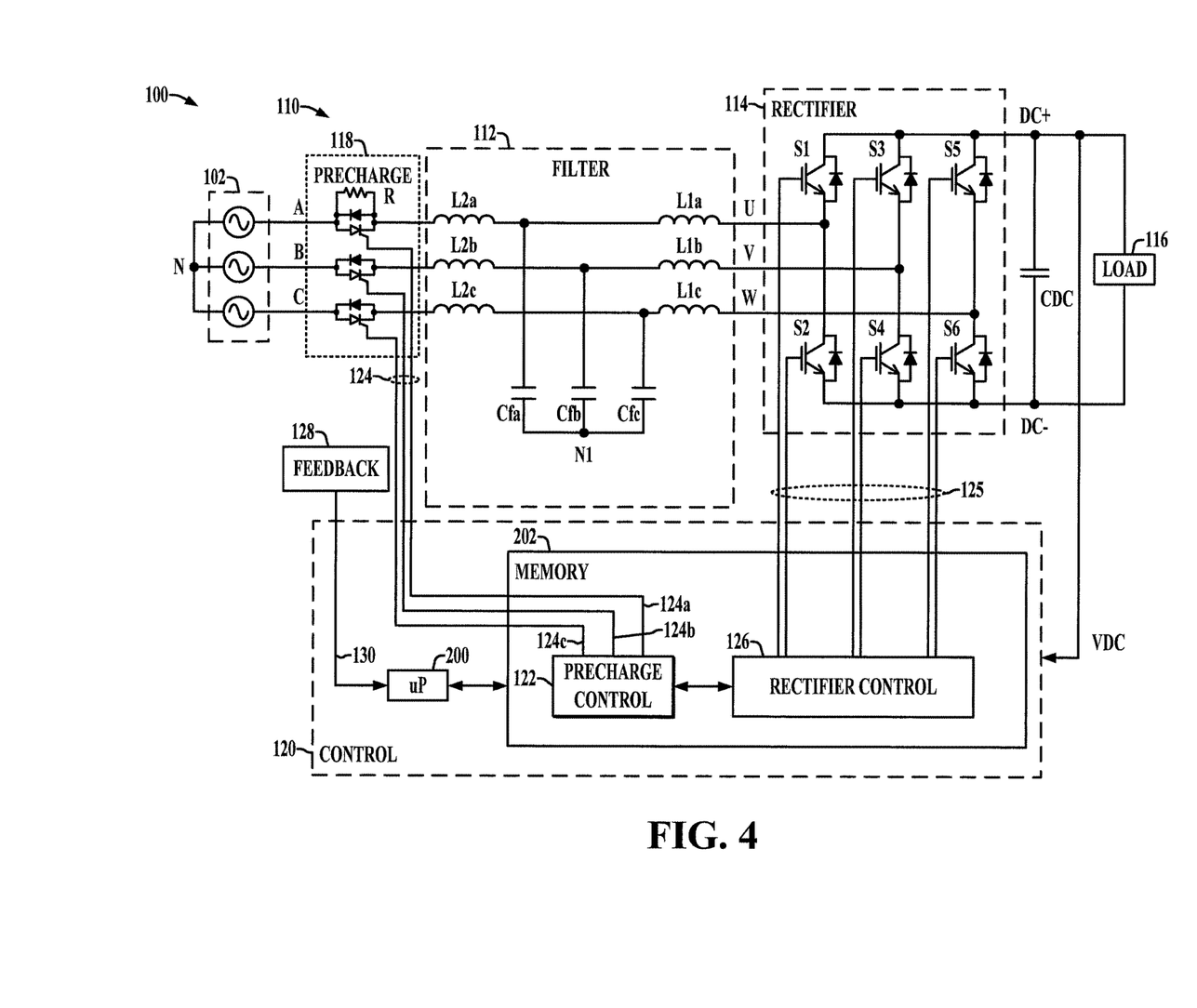
Figure 5:
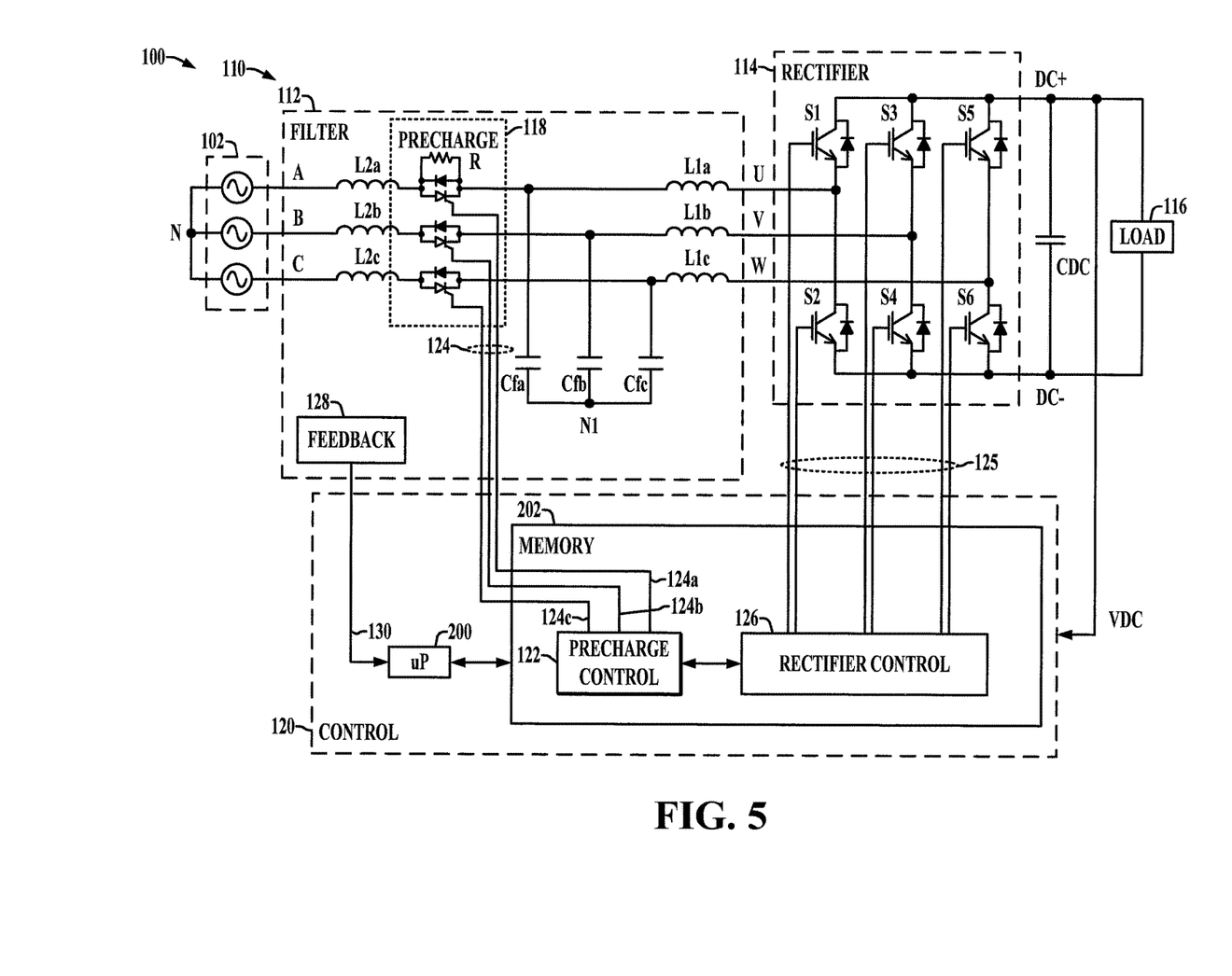
Figure 6:
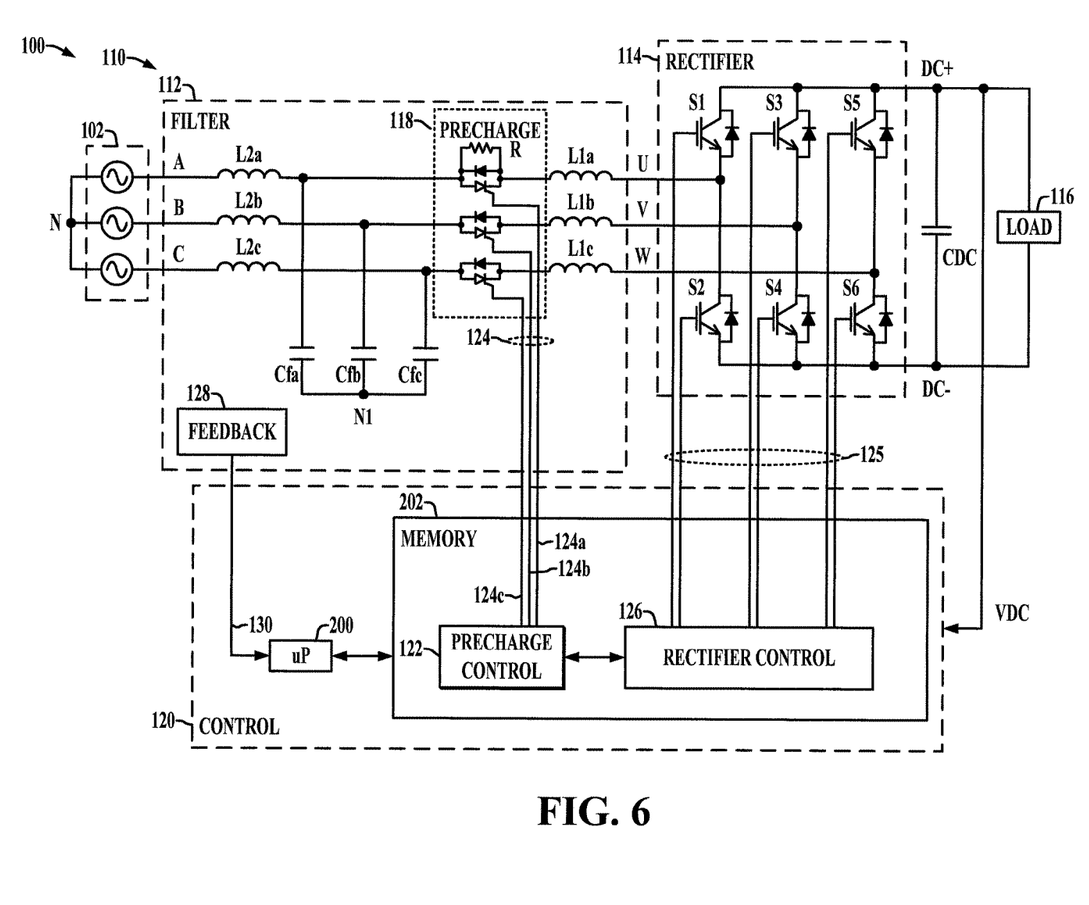
Figure 7:
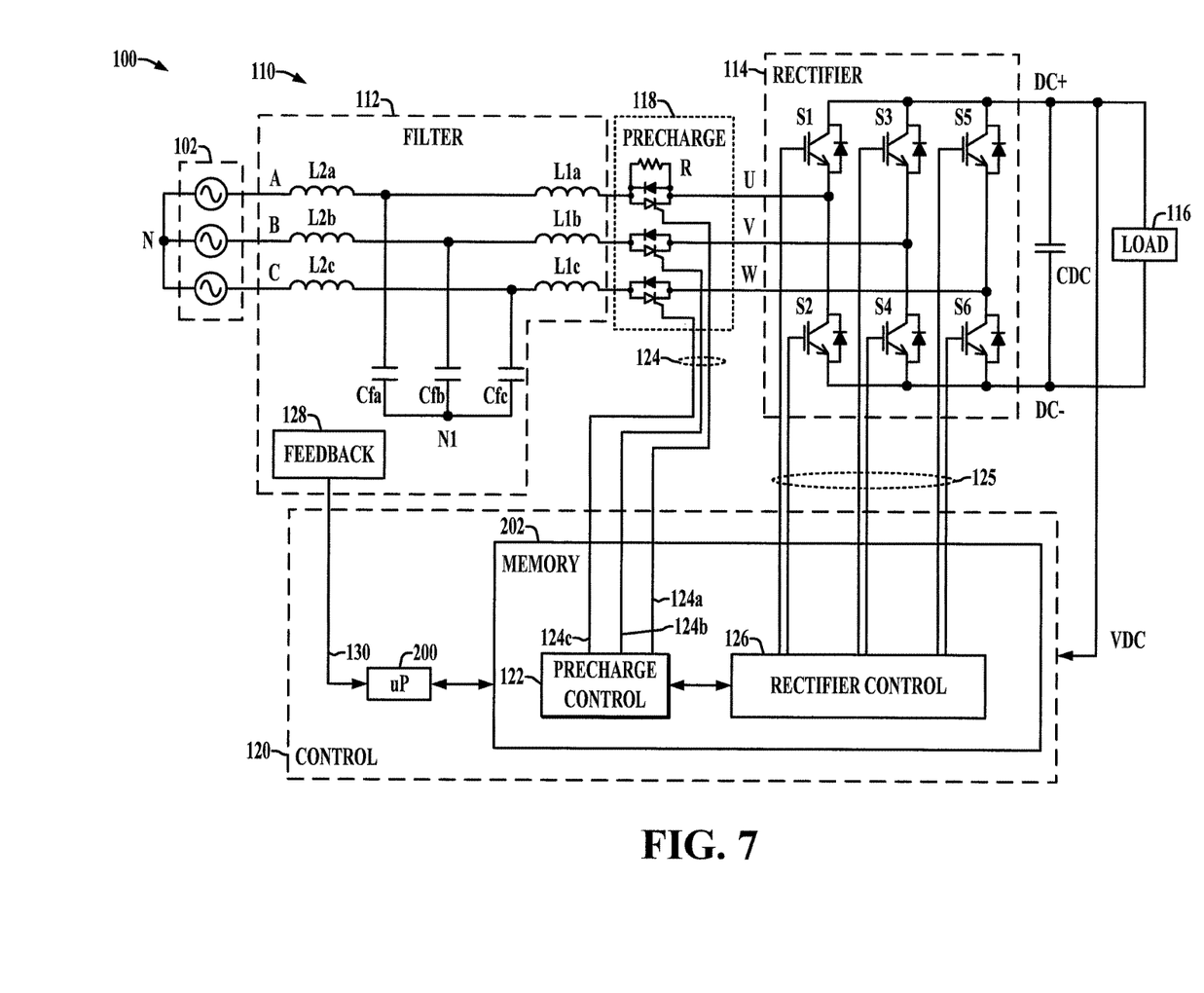

In the various non-limiting examples of FIGS. 1-7, the precharge circuit 118 is coupled between the AC input lines A, B, C and the AC input terminals U, V, W of the rectifier 114. In certain examples, the precharge circuit 118 is connected to filter capacitors Cf of the filter circuit 112 (FIGS. 1, 5 and 6). In other examples, the precharge circuit 118 is coupled between the AC input lines A, B, C and the filter circuit 112, and the filter circuit 112 is coupled between the precharge circuit 118 and the AC input terminals U, V, W of the rectifier 114 (FIGS. 2 and 4). In further examples, the filter circuit 112 is coupled between the AC input lines A, B, C and the precharge circuit 118, and wherein the precharge circuit 118 is coupled between the filter circuit 112 and the AC input terminals U, V, W of the rectifier 114 (FIGS. 3 and 7).

As shown in FIGS. 4-7, an example LCL filter circuit 112 includes first and second filter inductors L1 and L2 connected between the input of the rectifier 114 and the output of the source 102 for each phase A/U, B/V and C/W. The phase A/U of the filter 112 includes a first (rectifier side) inductor represented as an inductance L1a as well as a second (grid side) inductor represented as an inductance L2a. Similarly, the filter phase B/V includes first and second inductors represented by inductances L1b, L2b, and the filter phase C/W includes first and second inductors represented by inductances L1c, L2c. Between the first and second inductors L1 and L2 of each phase line of the filter 112, a filter capacitor Cf is connected from the line joining the corresponding inductors L1 and L2 to a filter neutral N1. These are shown in FIGS. 4-7 as filter capacitors Cfa, Cfb and Cfc. The filter neutral N1 can, but need not be, connected to the source neutral N. In other examples, the filter capacitors Cf can be connected in a delta configuration. Delta or Y connected filter capacitors in certain examples may include damping resistors or trap filter inductors in series with the capacitors.

The feedback circuit or system 128 includes one or more sensors (not shown) to sense or detect one or more electrical conditions in the filter circuit 112, the rectifier 114 and/or the intermediate DC bus circuit. The feedback circuit 128 provides one or more feedback signals or values 130 (e.g., analog signals and/or converted digital values) to the controller 120 for use in closed loop feedback control of the motor drive 110 generally, as well as for use by the precharge control component 122. As further shown in FIGS. 4-7, the rectifier 114 in one example is a switching rectifier with IGBT type switching devices S1-S6 individually coupled between a corresponding one of the AC input terminals U, V or W and one of the first and second DC output terminals DC+ or DC−. Other semiconductor-based switching devices can be used, including without limitation field effect transistors (FETs), etc. Each rectifier switching device S1-S6 is operated by a corresponding rectifier switching control signal 125 from the rectifier controller 124 of the control circuit 120 to selectively connect or disconnect the corresponding AC input terminal to the corresponding DC output terminal.

The precharge circuit 118 includes three AC circuit paths individually coupled between a corresponding one of the AC input lines A, B and C and a corresponding one of the AC input terminals U, V and W. The individual AC circuit paths include a semiconductor switching device (e.g., Qa, Qb and Qc in the three-phase example of FIG. 4). The semiconductor switching devices each operate according to a corresponding precharge control signal (e.g., 124a, 124b or 124c) to selectively allow current to flow from the corresponding AC input line A, B or C and the corresponding AC input terminal U, V or W. In addition, the individual AC circuit paths of the precharge circuit 118 include a reverse diode (e.g., Da, Db or Dc) with an anode coupled with the corresponding AC input terminal U, V or W, and a cathode coupled with the corresponding AC input line A, B or C. Furthermore, in order to mitigate excessive inrush current to charge the DC bus capacitor CDC and/or the capacitors Cf of the filter circuit 112, the precharge circuitry 112 includes one or more precharge resistors R. In the examples of FIGS. 4-7, a single precharge resistor R is connected in the AC circuit path associated with the input line A and the rectifier input terminal U. In other examples, a single precharge resistor R can be connected in parallel with the corresponding switching device Q and the reverse diode D of another one of the AC phases. In further examples, two or more precharge resistors R can be included in the precharge circuitry 118, individually connected in two or more corresponding ones of the AC circuit paths.

The controller 120 operates in first and second modes, including a first or PRECHARGE mode to charge the DC bus capacitor CDC, as well as a second or NORMAL operating mode during which the active front end rectifier 114 is actively switching to regulate the DC bus voltage VDC across the capacitor CDC. In the first mode, when the DC bus voltage is below a non-zero threshold value TH, the controller 120 provides precharge control signals 124a, 124b and 124c to turn all the semiconductor switching devices Qa, Qb, Qc off. This allows the DC bus capacitor CDC to charge through the precharge resistor R, with current flowing from the AC input line A through the resistor R into the filter 112 in FIG. 4, and current returning to one or both of the other AC input lines B and/or C through the corresponding reverse diodes of the precharge circuit 118. In the example of FIG. 4, the precharge current operates to charge up the filter capacitors Cfa, Cfb and Cfc of the filter circuit 112, in addition to charging up the DC bus capacitor CDC. In this example, the precharge current from the AC input line A conducts through the filter inductors L2a and L1a to the AC input terminal U of the rectifier 114. This current flows through the diode of the first rectifier switch S1 the, and charges the DC bus capacitor CDC. The return current flows from the capital DC− rectifier output terminal through one or both of the diodes of S4 or S6, and flows back through the corresponding filter inductors of the B/V and/or C/W AC lines of the filter 112, and returns through the reverse diodes Db and/or Dc of the precharge circuit 118 to the power source 102.

The controller 120 receives a feedback signal representing the DC bus voltage VDC, and operates in the appropriate first or second mode accordingly. In the second mode, when the voltage VDC is greater than or equal to the non-zero threshold value TH, the controller 120 provides the precharge control signals 124a, 124b and 124c to turn all the semiconductor switching devices Qa, Qb and Qc on. This bypasses or short-circuits the one or more precharge resistor (s), and allows the controller 120 to begin and continue operation of the rectifier 114. In the illustrated example of FIG. 4, the controller 120 also implements the rectifier control component 126, which provides rectifier switching control signals 125 to turn the rectifier switching devices S1-S6 off in the first mode. In in the second mode, the controller 120 provides the rectifier switching control signals 125 to operate the rectifier switching devices S1-S6 to convert AC input power to control the DC bus voltage VDC across the DC bus capacitor CDC. In certain examples, moreover, the controller 120 transitions from the first mode to the second mode by providing the precharge control signals 124a, 124b, 124c to initially turn on all the semiconductor switching devices Qa, Qb and Qc when a voltage of the given AC circuit path is at a peak value in order to minimize inrush In the second mode, the precharge switches Qa, Qb and Qc are turned on and maintained in an on state to allow normal operation of the motor drive 110.

Any suitable semiconductor switching devices Qa, Qb and Qc can be used in the precharge circuit 118. In the illustrated examples, the switching devices Qa, Qb and Qc are thyristors, such as silicon-controlled rectifiers (SCRs). The thyristors individually include an anode coupled with the corresponding AC input line A, B or C, as well as a cathode coupled with the corresponding AC input terminal U, V or W, and a gate to receive the corresponding precharge control signal 124a, 124b or 124c from the controller 120. In this example, moreover, the controller 120 provides the precharge control signals 124a, 124b and 124c as constant frequency, constant duty cycle pulse signals to turn all the thyristors Qa, Qb and Qc on in the second mode. In one implementation, the thyristors Qa, Qb and Qc are fully fired in the second mode by applying a relatively high frequency, constant duty cycle pulse signal to each of the thyristors Qa, Qb and Qc, such as a 10% duty cycle at approximately 30 kHz switching frequency in one non-limiting implementation. This serves to maintain the thyristors Qa, Qb and Qc in the fully on condition throughout normal operation in the second mode. In other examples, different types or forms of semiconductor-based switches can be used in the precharge circuitry 118, including without limitation bipolar transistors, field effect transistors, or other semiconductor devices, etc.

In the example of FIG. 5, the precharge circuit 118 is coupled in the filter circuit 112 with the filter capacitors Cf. In this implementation, like that of FIG. 4, the operation of the precharge circuit 118 allows precharging of the filter capacitors Cf, in addition to precharging the DC bus capacitor CDC. In FIG. 6, the precharge circuit 118 is also connected to the filter capacitors Cf within the filter circuit 112. FIG. 7 shows another example in which the precharge circuit 118 is disposed between the filter 112 and the rectifier 114.

Figure 8:
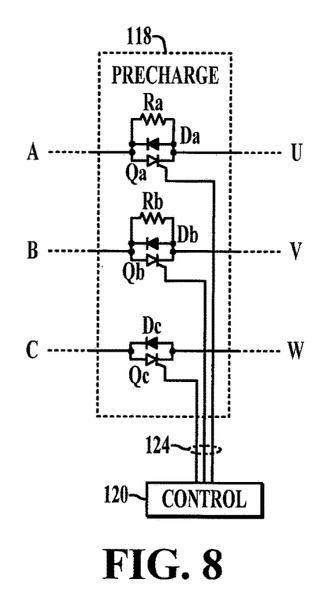
Figure 9:
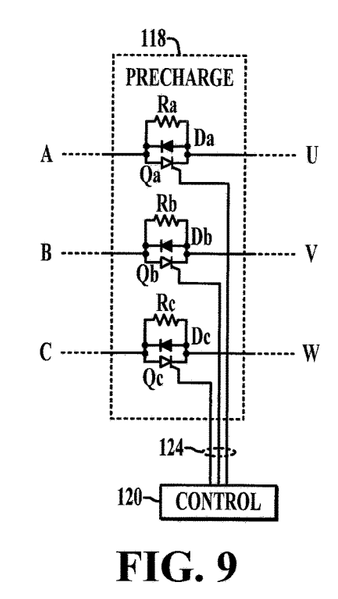

As seen in FIGS. 8 and 9, precharge resistors R can be provided in more than one of the AC phases. FIG. 8 shows one example in which the precharge circuitry for phases A/U and B/V include precharge resistors Ra and Rb, respectively. In FIG. 9, precharge resistors Ra, Rb and Rc are respectively provided in each one of the AC phases. The precharge circuitry can be used in other single or multiphase implementations, including more than three phases (not shown). The precharge circuits 118 in other examples can include reversed SCR and diode connections. For example, an alternate implementation of the precharge circuit 118 can include, for a given phase, and SCR or other semiconductor switching device with an anode connected to the rectifier side and a cathode connected to the input side, along with a diode having an anode connected to the input side and a cathode connected to the rectifier side, where one or more such circuits includes a resistor connected in parallel with the SCR and diode. In such examples, the SCR(s) are fired at the negative peak of the corresponding phase voltage.

Figure 10:
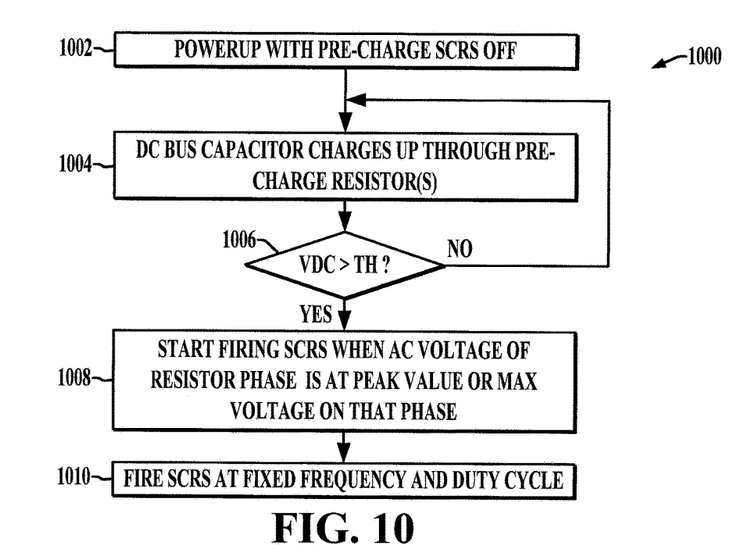
FIG. 10 is a flow diagram.

FIG. 10 illustrates a process or method 1004 charging a DC bus capacitor of a power conversion system 110. At 1002, the driver power conversion system 110 is powered up with the precharge switches (e.g., SCRs) all turned off. This first operating mode continues at 1004, where the DC bus capacitor (e.g., CDC above) charges up through one or more precharge resistors R. The controller 120 determines at 1006 whether the DC bus voltage VDC exceeds a non-zero threshold value TH. If not, operation in the first mode continues with the DC bus capacitor CDC charging up at 1004 through the precharge resistor or resistors R. Once the DC bus voltage is greater than or equal to the threshold (YES at 1006), the process 1000 continues in a second mode, with the controller 120 beginning to fire the SCRs at 1008 when the AC voltage of the phase having the precharge resistor is at a peak value or maximum voltage on that phase relative to the other two phases to facilitate reduced inrush current. Operation thereafter continues in the second mode, with the controller 120 maintaining the precharge switches (e.g., SCRs) fully on. As mentioned above, this can be accomplished in one example by providing a constant duty cycle, constant frequency pulse signal to each of the SCRs.

In the preceding specification, various embodiments have been described with reference to the accompanying drawings. It will, however, be evident that various modifications The following is claimed:

1. A power conversion system, comprising:
a plurality of AC input lines coupleable to receive AC input power from a power source; a rectifier, including a plurality of AC input terminals, first and second DC output terminals, and a plurality of rectifier switching devices individually coupled between a corresponding one of the AC input terminals and one of the first and second DC output terminals; a DC bus capacitor coupled between the first and second DC output terminals; a filter circuit coupled between the AC input lines and the AC input terminals of the rectifier; a precharge circuit coupled between the AC input lines and the AC input terminals of the rectifier, the precharge circuit including: a plurality of AC circuit paths individually coupled between a corresponding one of the AC input lines and a corresponding one of the AC input terminals, the individual AC circuit paths including a semiconductor switching device operative according to a corresponding precharge control signal to allow current to flow between the corresponding AC input line and the corresponding AC input terminal, and a diode coupled between the corresponding AC input terminal and the corresponding AC input line, and a precharge resistor coupled in a given one of the AC circuit paths between the corresponding AC input line and the corresponding AC input terminal; and
a controller operative in a first mode to provide the precharge control signals to turn all the semiconductor switching devices off to allow the DC bus capacitor to charge through the precharge resistor, in a second mode to provide the precharge control signals to turn all the semiconductor switching devices on, and, in transitioning from the first mode to the second mode, to provide the precharge control signals to initially turn all the semiconductor switching devices on when a voltage of the given AC circuit path is at a peak value.

2. The power conversion system of claim 1, wherein the controller is further operative in the first mode to provide switching control signals to turn the rectifier switching devices off, and in the second mode to provide the switching control signals to operate the rectifier switching devices to convert AC input power to control a DC bus voltage across the DC bus capacitor.

3. The power conversion system of claim 1, wherein the semiconductor switching devices of the precharge circuit are thyristors individually including an anode coupled with the corresponding AC input line, and a cathode coupled with the corresponding AC input terminal, and a gate to receive the corresponding precharge control signal from the controller.

4. The power conversion system of claim 3, wherein the controller is operative in the second mode to provide the precharge control signals as constant frequency, constant duty cycle pulse signals to turn all the thyristors on.

5. The power conversion system of claim 4, wherein the controller is operative in the first mode when a DC bus voltage across the DC bus capacitor is less than a non-zero threshold value, and wherein the controller is operative in the second mode when the DC bus voltage is greater than or equal to the non-zero threshold value.

6. The power conversion system of claim 3, wherein the controller is operative in the first mode when a DC bus voltage across the DC bus capacitor is less than a non-zero threshold value, and wherein the controller is operative in the second mode when the DC bus voltage is greater than or equal to the non-zero threshold value.

7. The power conversion system of claim 1, wherein the controller is operative in the first mode when a DC bus voltage across the DC bus capacitor is less than a non-zero threshold value, and wherein the controller is operative in the second mode when the DC bus voltage is greater than or equal to the non-zero threshold value.

8. The power conversion system of claim 1, comprising a second resistor coupled between a corresponding AC input line and a corresponding AC input terminal in second one of the AC circuit paths.

9. The power conversion system of claim 1, wherein the precharge circuit is connected to filter capacitors of the filter circuit.

10. The power conversion system of claim 1, wherein the precharge circuit is coupled between the AC input lines and the filter circuit, and wherein the filter circuit is coupled between the precharge circuit and the AC input terminals of the rectifier.

11. The power conversion system of claim 1, wherein the filter circuit is coupled between the AC input lines and the precharge circuit, and wherein the precharge circuit is coupled between the filter circuit and the AC input terminals of the rectifier.

12. A system to charge a DC bus capacitor of a power conversion system, comprising: a plurality of AC circuit paths individually coupled between a corresponding one of a plurality of AC input lines and a corresponding one of a plurality of AC input terminals of a rectifier, the individual AC circuit paths including a semiconductor switching device operative according to a corresponding precharge control signal to allow current to flow between the corresponding AC input line and the corresponding AC input terminal, and a diode coupled between the corresponding AC input terminal and the corresponding AC input line; and a precharge resistor coupled in a given one of the AC circuit paths between the corresponding AC input line and the corresponding AC input terminal; and a controller operative in a first mode to provide the precharge control signals to turn all the semiconductor switching devices off to allow a DC bus capacitor at an output of the rectifier to charge through the precharge resistor, and in a second mode to provide the precharge control signals to turn all the semiconductor switching devices on, and in transitioning from the first mode to the second mode, to provide the precharge control signals to initially turn all the semiconductor switching devices on when a voltage of the given AC circuit path is at a peak value.

13. The system of claim 12, wherein the semiconductor switching devices of the precharge circuit are thyristors individually including an anode coupled with the corresponding AC input line, and a cathode coupled with the corresponding AC input terminal, and a gate to receive the corresponding precharge control signal from the controller.

14. A method to charge a DC bus capacitor of a power conversion system, the method comprising: coupling a precharge circuit between AC input lines and AC input terminals of a rectifier, the precharge circuit including a plurality of AC circuit paths individually coupled between a corresponding one of a plurality of AC input lines and a corresponding one of the AC input terminals of a rectifier, the individual AC circuit paths including a semiconductor switching device operative according to a corresponding precharge control signal to allow current to flow between the corresponding AC input line and the corresponding AC input terminal, and a diode coupled between the corresponding AC input terminal and the corresponding AC input line; coupling a precharge resistor in a given one of the AC circuit paths between the corresponding AC input line and the corresponding AC input terminal; in a first mode, when a DC bus voltage across the DC bus capacitor is less than a non-zero threshold value, turning all the semiconductor switching devices off to allow the DC bus capacitor to charge through the precharge resistor; and in a second mode when the DC bus voltage is greater than or equal to the non-zero threshold value, turning all the semiconductor switching devices on; and when transitioning from the first mode to the second mode, initially turning all the semiconductor switching devices on when a voltage of the given AC circuit path is at a peak value.

15. The method of claim 14, further comprising:
   in the second mode, turning all the semiconductor switching devices on by providing precharge control signals as constant frequency, constant duty cycle pulse signals to the semiconductor switching devices.

\* \* \* \* \*